United States Patent
Mujumdar et al.

(10) Patent No.: US 9,298,791 B2
(45) Date of Patent: *Mar. 29, 2016

(54) ADDING A KEY COLUMN TO A TABLE TO BE REPLICATED

(71) Applicant: International Business Machines Corporation, Armonk, NY (US)

(72) Inventors: Prasad S. Mujumdar, Fremont, CA (US); Clarence M. Pruet, III, Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 286 days.

This patent is subject to a terminal disclaimer.

(21) Appl. No.: 13/953,786

(22) Filed: Jul. 30, 2013

(65) Prior Publication Data

US 2013/0318043 A1 Nov. 28, 2013

Related U.S. Application Data

(63) Continuation of application No. 13/194,393, filed on Jul. 29, 2011, now Pat. No. 8,554,730.

(51) Int. Cl.
*G06F 17/00* (2006.01)
*G06F 17/30* (2006.01)

(52) U.S. Cl.
CPC .... *G06F 17/30575* (2013.01); *G06F 17/30578* (2013.01)

(58) Field of Classification Search
CPC .................. G06F 17/30575; G06F 17/30578
See application file for complete search history.

(56) References Cited

U.S. PATENT DOCUMENTS

| | | | |
|---|---|---|---|
| 7,020,647 B1 | 3/2006 | Egan et al. | |
| 7,562,102 B1 | 7/2009 | Sumner et al. | |
| 7,627,611 B2 | 12/2009 | Gusciora | |
| 2004/0030703 A1 | 2/2004 | Bourbonnais et al. | |
| 2007/0226274 A1 | 9/2007 | Nishino | |
| 2008/0052322 A1 | 2/2008 | Gusciora | |
| 2008/0133543 A1 | 6/2008 | Fu et al. | |
| 2010/0223269 A1 | 9/2010 | Shuf et al. | |
| 2011/0167038 A1* | 7/2011 | Wang et al. | 707/627 |
| 2011/0320400 A1 | 12/2011 | Namini | |
| 2013/0031051 A1 | 1/2013 | Mujumdar et al. | |

OTHER PUBLICATIONS

Storer, Mark W. et al., Secure Data Deduplication, Proceedings of the 4th ACM international workshop on Storage security and survivability, 2008, pp. 1-10, ACM, New York, New York, United States.

(Continued)

*Primary Examiner* — Tarek Chbouki
(74) *Attorney, Agent, or Firm* — Patterson & Sheridan, LLP (57) ABSTRACT

Techniques are disclosed for adding a key column to a table to be replicated, where the key column stores key values for use in replication. In one embodiment, a request is received to add a table to a replication domain, such that the table is replicated from a first database server to at least a second database server. Key values are generated for both existing records and new records subsequently requested to be inserted into the table, respectively. Each generated key value is unique across the replication domain. Further, the key column may be added to the table without requiring exclusive access to the table.

20 Claims, 5 Drawing Sheets

(56) References Cited

OTHER PUBLICATIONS

Lin, Yi et al., Snapshot Isolation and Integrity Constraints in Replicated Databases, ACM Transactions on Database Systems, Jun. 2009, Article No. 11, vol. 34, Issue 2, ACM, New York, New York, United States.

Disclosed Anonymously, A Relational Database Table with Reuseable Row Indices, Intellectual Property Library, Jul. 21, 2010, <http://priorartdatabase.com/IPCOM/000197764>.

* cited by examiner

| COUNTER ID | POLICY | VALUE |
|---|---|---|
| 01 | INCREMENT EVERY SECOND; LOG EVERY MINUTE; INCREASE BY 60 UPON SERVER RESTART | 7200 |
| 02 | INCREMENT EVERY INSERT | 11500 |

FIG. 3

TABLE EMPLOYEE (TABLE ID=123) ON SERVER NODE 5

| EMPLOYEE ID | FIRST NAME | LAST NAME | ... |
|---|---|---|---|
| 001 | ADAM | WHITE | ... |
| 002 | BOB | SMITH | ... |
| ... | ... | ... | ... |
| 050 | WILLIAM | JONES | ... |

ROW ID

| PAGE | SLOT | KEY VALUE | | | |
|---|---|---|---|---|---|
| 15 | 1 | 5 | 123 | 15 | 1 |
| 15 | 2 | 5 | 123 | 15 | 2 |
| ... | ... | ... | ... | ... | ... |
| 22 | 5 | 5 | 7200 | 11500 | 0 |

EXISTING RECORDS 324
NEW RECORD 326
COLLISION AVOIDANCE VALUE 322

FIG. 6B EXISTING RECORD - GENERATE KEY VALUES USING FIRST ALGORITHM

FIG. 6C NEW RECORD - GENERATE KEY VALUES USING SECOND ALGORITHM

ADDING A KEY COLUMN TO A TABLE TO BE REPLICATED

CROSS-REFERENCE TO RELATED APPLICATIONS

This application is a continuation of co-pending U.S. patent application Ser. No. 13/194,393, filed Jul. 29, 2011. The aforementioned related patent application is herein incorporated by reference in its entirety.

BACKGROUND

Databases are computerized information storage and retrieval systems. A relational database management system is a computer database management system (DBMS) that uses relational techniques for storing and retrieving data. An object-oriented programming database is a database that is congruent with the data defined in object classes and sub-classes.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests are often made using high-level query languages such as Structured Query Language (SQL). Upon receiving such a request, the DBMS may execute the request against a corresponding database, and return any result of the execution to the requesting entity.

SUMMARY

Embodiments of the invention provide a method, product and system for performing an operation that includes receiving a request to add a table to a replication domain, such that the table is replicated from a first database server to at least a second database server, where the table includes at least a first record. The operation also includes, responsive to the request, generating a key value for the first record on the first database server. Subsequent to receiving the request, a second record to be inserted into the table on the first database server is received. A key value for the second record on the first database server is then generated. Each generated key value is unique across the replication domain. Further, a column is added to the table to store the generated key values. The column is added without requiring exclusive access to the table.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for adding a key column to a table to be replicated, where the key column stores key values that are unique across a replication domain that includes at least a first database server and a second database server. The replication domain is a set of all database servers that are configured to communicate with one another to replicate data based on a replication configuration, which may be user-defined. The replication configuration specifies which tables should be replicated and which subset of database servers in the replication domain the tables should be replicated to. One embodiment of the invention provides a database management system (DBMS) executing on the first database server. The DBMS receives a request to add a table to the replication domain, such that the table is replicated from the first database server to at least the second database server, and where the table includes at least a first record. In response to the request, the DBMS generates a key value for the first record on the first database server. Subsequent to receiving the request, the DBMS receives a second record to be inserted into the table on the first database server. The DBMS also generates a key value for the second record on the first database server. Each generated key value is unique across the replication domain. In other words, each key value will not conflict with the key value of any other row in the replication domain. Further, the key values are generated such that the key column may be added to the table without requiring exclusive access to the table. Accordingly, access to the table by database applications is not disrupted.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a DBMS) or related data available in the cloud. For example, the DBMS could execute on a computing system in the cloud and provide access to one or more tables. The one or more tables may be stored at a storage location in the cloud. Doing so allows the one or more tables to be accessed from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
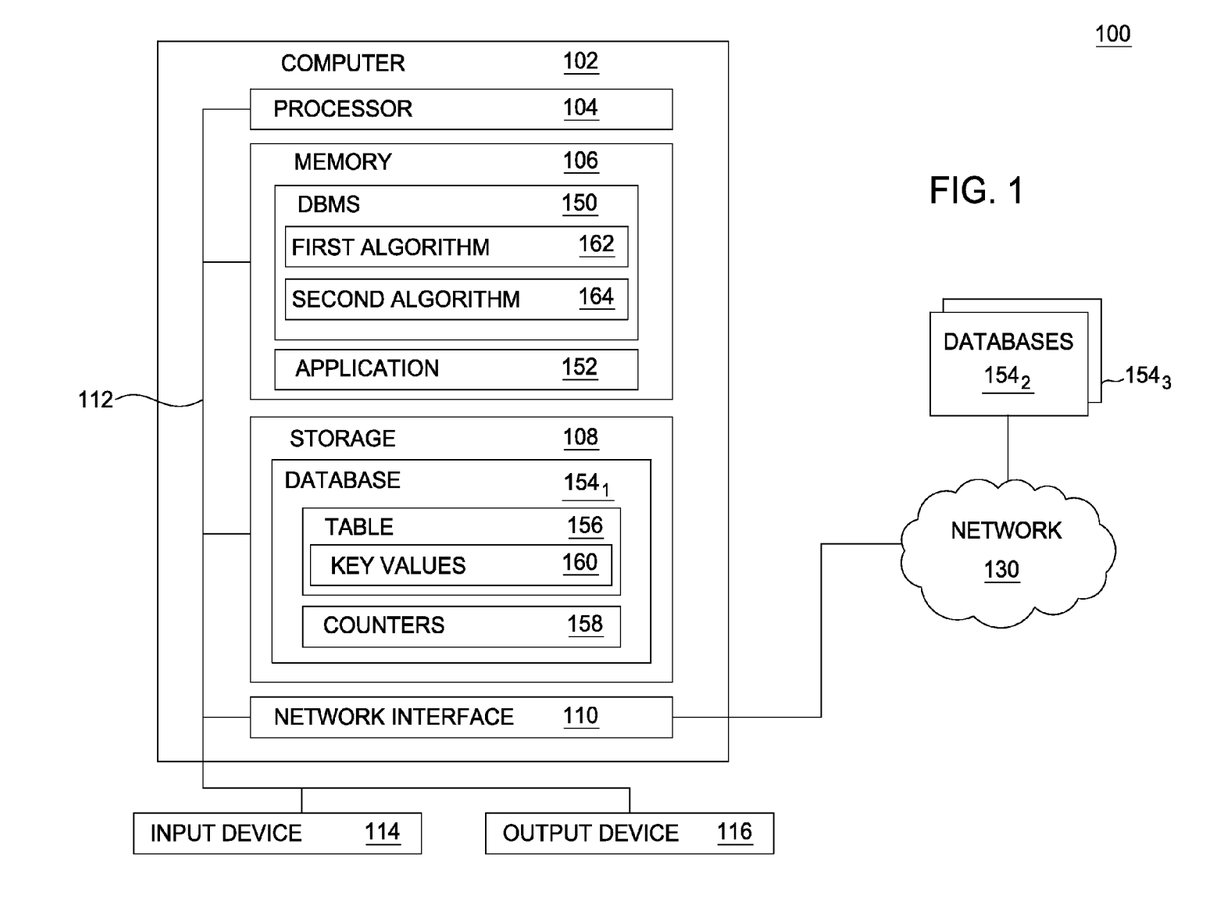
FIG. 1 is a block diagram illustrating a system for adding a key column to a table to be replicated, according to one embodiment of the invention.

FIG. 1 is a block diagram illustrating a system 100 for adding a key column to a table to be replicated, according to one embodiment of the invention. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard and/or a mouse may be used. The output device 116 may be any device for providing output to a user of the computer 102. For example, the output device 116 may be any conventional display screen or set of speakers. Although shown separately from the input device 114, the output device 116 and input device 114 may be combined. For example, a display screen with an integrated touch-screen may be used.

As shown, the memory 106 of the computer 102 includes a database management system (DBMS) 150 configured to manage a database $154_1$ stored in the storage 108 of the computer 102. The memory 106 of the computer 102 also includes an application 152 accessing the database $154_1$ via the DBMS 150. In other embodiments, the application 152 executes on a different computer that communicates with the computer 102 via the network 130. The DBMS 150 may also communicate with other database management systems executing on other computers via the network 130, where each of the other database management systems manage a respective database $154_2$, $154_3$. A computer on which a database management system is executing may also be referred to herein as a database server. For clarity, only the databases $154_2$, $154_3$—and not the other database management systems or the other computers—are shown in FIG. 1.

In one embodiment, the DBMS 150 may communicate with the other database management systems to provide additional functionality such as replication. Replication refers to a mechanism for maintaining synchronized copies of data across multiple database servers. Changes to the data—such as inserts, updates, and deletes—may be replicated by retrieving logged transactions on a source database server and transmitting the logged transactions to be executed on one or more target servers as regular transactions. Replication may often require the DBMS 150 to be able to uniquely identify each record in the replication domain. For example, if a record is replicated from a first database server to a second database server and a third database server, each replicated copy of the record is to be uniquely identified, relative to any replicated copy of any record (as opposed to just any replicated copy of the replicated record) in the replication domain.

To this end, upon receiving a request to add an existing table to a replication domain, the DBMS 150 may generate key values 160 for each record in the table, according to a first algorithm 162. For each record that is subsequently inserted into the table, the DBMS 150 may generate key values according to a second algorithm 164, to avoid collisions with key values previously generated for the table. A key value collision occurs when two records in the replication domain have identical key values. A key value collision may also be referred to as a key value conflict. The generated key values are stored in a key column that is added to the table. At least in some embodiments, the first algorithm 162 does not require the DBMS 150 to have exclusive access to the table. Accordingly, the table may be added to the replication domain without disrupting access to the table by the application 152. At least in some embodiments, the second algorithm uses one or more counters 158 maintained by the DBMS 150. Depending on the embodiment, each counter 158 may be specific to a respective DBMS or shared by multiple database management systems. In other words, each DBMS may maintain a local counter or multiple database management systems may share a single, global counter.

Figure 2:
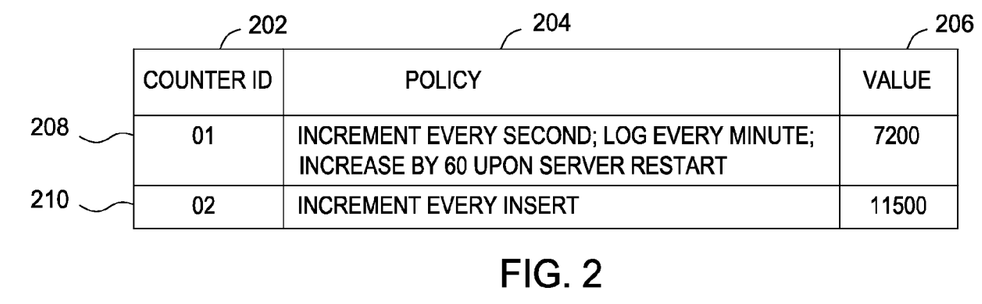
FIG. 2 illustrates counters maintained by a database management system for use in generating key values, according to one embodiment of the invention.

FIG. 2 illustrates the counters 158 of FIG. 1, according to one embodiment of the invention. As shown, counters include a first counter 208 and a second counter 210. Each counter 208, 210 has an associated counter identifier 202, an associated policy 204, and an associated value 206. In this particular example, the policy for the first counter 208 specifies to increment the first counter 208 every second (the "increment duration"). The increment duration refers to a time period between two incrementing actions. The value of the first counter is 7200, which represents that two hours have elapsed since the first counter had a value of zero. The policy for the second counter 210 specifies to increment the second counter 210 upon every record being inserted into the database $154_1$. The value of the second counter 210 is 11500, which represents that 11,500 insertions have occurred since the second counter 210 had a value of zero. In one embodiment, each counter 208, 210 overflows to zero.

As shown, the policy for the first counter 208 also specifies to log the first counter 208 every minute (the "logging duration") and to increase the first counter 208 by sixty upon a restart of the DBMS 150. The logging duration refers to the time period between two logging actions. At least in some embodiments, the value of sixty is obtained by dividing the logging duration by the increment duration. By increasing the first counter 208 by sixty upon restart following a server crash, the DBMS 150 may avoid generating key values that collide with key values generated prior to the server crash.

Further, the policies described herein may be tailored to suit the needs of a particular case. For example, in an alternative embodiment, the first counter 208 is incremented every half-second, logged every five minutes, and increased by three hundred upon server restart.

Figure 3:
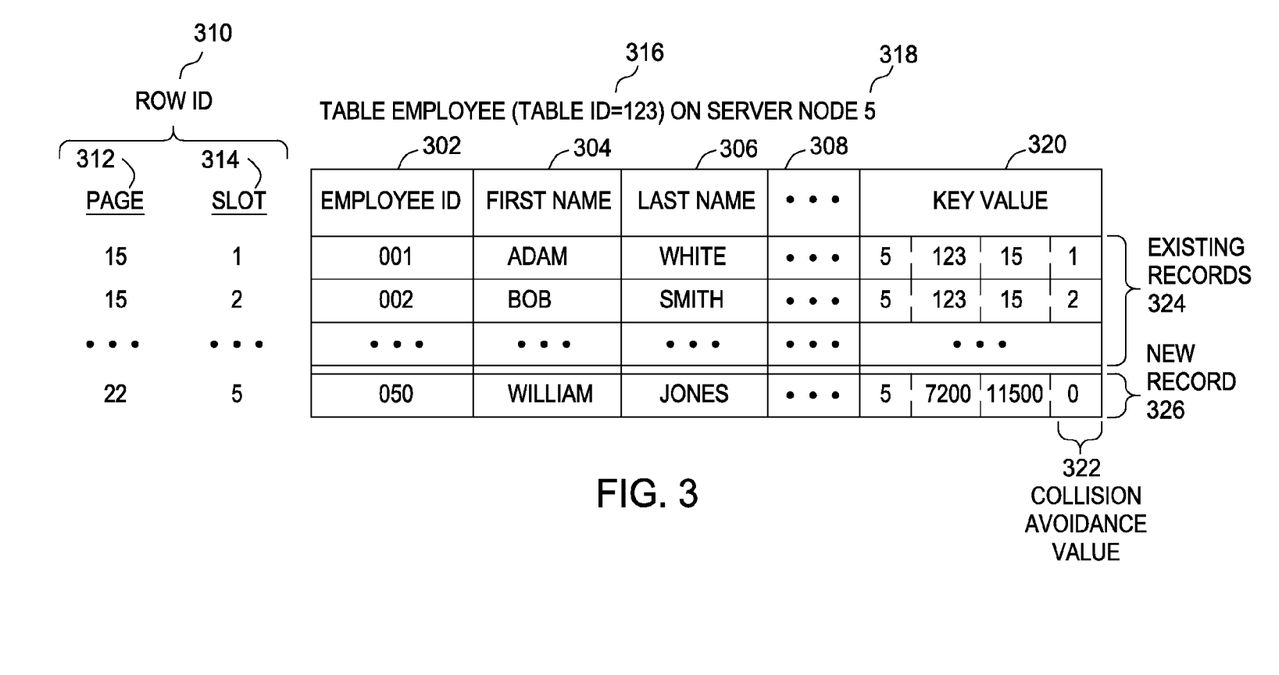
FIG. 3 illustrates a table for which key values are to be generated, according to one embodiment of the invention.

FIG. 3 illustrates the table 156 of FIG. 1, according to one embodiment of the invention. As shown, the table has an associated table identifier 316. The table identifier 316 uniquely identifies the table relative to other tables stored on the computer 102. Further, the computer 102 (on which the table is stored) has an associated server node identifier 318. The server node identifier uniquely identifies the computer 102 relative to other computers in the replication domain. The server node identifier may also be referred to herein as a node identifier. In this particular example, the table identifier 316 stores the value of "123", and the server node identifier stores the value of "5".

As shown, each record in the table includes an employee identifier 302, a first name 304, and a last name 306. Each record in the table may also include other fields, such as date of birth, social security number, job title, salary grade, employment start date, etc. For clarity, the other fields are not shown in FIG. 3. Each record may also have an associated row identifier 310, which includes a page number 312 and a slot number 314. The row identifier 310 for each record represents a physical location of the record in the database $154_1$. The row identifiers are maintained by the DBMS 150 and may be stored in one or more system tables in the database $154_1$. As used herein, a system table refers to a table configured to be accessible only with administrative privileges to the database $154_1$. Collectively, the table identifier 316 and the row identifier 310 characterize the physical location of the record in the database $154_1$.

As shown, the table contains a first record having an employee identifier of "001" and representing employee Adam White. The first record is stored at slot number 1 of page number 15 in the database $154_1$. The table contains a second record having an employee identifier of "002" and representing employee Bob Smith. The second record is stored at slot number 2 of page number 15 in the database $154_1$. The table may also contain additional records representing other employees. For clarity, the additional records are not shown in FIG. 3.

Assume that the DBMS 150 receives a request to add the table to the replication domain, such that the table is replicated from the database $154_1$ to one or more target databases $154_2$, $154_3$ on the network 130. Replicating the table to the target databases $154_2$, $154_3$ includes copying the table to the target databases $154_2$, $154_3$ and further includes adding a key column to each copy of the table (including the original copy), where the key column stores key values that are unique across the replication domain. The key column is used internally by the DBMS 150 in managing and/or maintaining the replicated table. Depending on the embodiment, the table may be copied prior to, concurrently with, or subsequent to the key values being generated. In one embodiment, the key column of each database $154_1$, $154_2$, $154_3$ is independently generated by the DBMS managing the respective database $154_1$, $154_2$, $154_3$. Further, depending on the embodiment, when the existing rows of the table are replicated to the target databases $154_2$, $154_3$, the target databases $154_2$ $154_3$ may be configured treat the replicated rows as either existing rows or new rows for the purposes of key value generation. In other words, the other databases $154_2$, $154_3$ may use either the first algorithm or the second algorithm for generating key values for the rows already existing in the table that is being replicated. Treating the replicated rows as existing rows may improve the performance of replication at least in some cases.

In one embodiment, during replication, the DBMS 150 generates a key value for each existing record 324 in the table. As described above, the key value for each existing record 324 in the table is generated according to a first algorithm. In one embodiment, the first algorithm specifies to generate the key value for each existing record based on one or more components. In a particular embodiment, the components used by first algorithm include the server node identifier 318, the table identifier 316, and the row identifier 310 for the respective record, where the row identifier 310 includes the page number 312 and the slot number 314.

For example, the key value for the record representing Adam White may be generated by concatenating the server node identifier of "5" (0x05), the table identifier of "123" (0x7B), the page number of "15" (0x0F), and the slot number of "1" (0x01) together into a single bitstring. Suppose that the server node identifier is four bytes long, the table identifier is four bytes long, the page number is three bytes long, and the slot number is one byte long. Because two hexadecimal digits represents a byte, the single bitstring may then be given by the hexadecimal value of 00000005 0000007B 00001501. Those skilled in the art will recognize that the byte lengths are merely exemplary and may be tailored to suit the needs of a particular case. Further, the order in which the components are concatenated may also be tailored to suit the needs of a particular case.

Similarly, the key value for the record representing Bob Smith may be generated by concatenating the server node identifier of "5", the table identifier of "123", the page number of "15", and the slot number of "2" together into a single bitstring. The single bitstring may be given by the hexadecimal value of 00000005 0000007B 00001502. Key values for other existing records may also be generated in a similar manner. Accordingly, key values that are unique across the replication domain may be generated for existing records. In particular, using the server node identifier in generating the key values allows replicated copies of each record to have a distinct key value, because each replicated copy is stored on a respective server with a distinct server node identifier. For example, if the record representing Adam White is replicated to a database server having a server node identifier of "12" (0x0C), the key value for the replicated record on that database server may begin with the hexadecimal value of 0000000C rather than 00000005. Further, at least in some embodiments, the first algorithm also specifies that the key value for a record is to remain unchanged, even if the record is moved to a new physical location (e.g., as a result of an update). Doing so avoids increasing complexity and reducing performance associated with performing updates to the table.

In one embodiment, the DBMS 150 may add a column to the table using an alter command, where the column is used for storing the key values. The added column may also be referred to herein as a key column. The alter command may be a normal alter command or an in-place alter command. The normal alter command is configured to alter a schema of a table by creating a new table having the altered schema, copying data from the (old) table to the new table, and deleting the old table. For example, the normal alter command may be used in conjunction with one or more keywords to request the DBMS 150 to programmatically generate unique values for a new column, without any further input. An example of such a keyword is the ROWIDS keyword supported by IBM® Informix®.

In one embodiment, the in-place alter command is configured to alter a schema of a table while deferring changing the physical representation of rows of the table until the rows are updated responsive to any subsequent update command. Unlike the normal alter command, the in-place alter command does not require exclusive access to the table. Especially in cases where the old table stores vast amounts of data, copying data from the old table to the new table can be costly in terms of performance. On the other hand, the DBMS 150 may require certain preconditions to be met in order for the in-place alter command to be used. For example, the DBMS 150 may require that the ROWIDS keyword is not present when using the in-place alter command. By generating key values using only static values (i.e., the server node identifier and the table identifier) and row identifiers, the ROWIDS keyword need not be present, and hence the in-place alter command may be used to add the column to the table. Accordingly, the existing table may be replicated without disrupting access to the table by one or more applications. Performance of the DBMS 150 and/or of the applications may be improved as a result.

Further, at least in some embodiments, the added column is a shadow column, also referred to as a hidden column. As used herein, a shadow column (or hidden column) refers to a column that is accessible only with administrative privileges to the database 154$_1$. Using a shadow column to store the key values prevents the undesirable scenario of applications accessing and/or relying on the key values, which are not intended for consumption by the applications. By hiding the key values from the applications, each replicated copy of a table appears as an identical copy to the applications.

Assume that after the existing table is successfully replicated to one or more additional database servers, the DBMS 150 receives a new record 326 to be added to the table. As shown, the new record 326 has an employee identifier of "050" and represents employee William Jones. To prepare the new record 326 for replication, the DBMS 150 generates a key value for the new record 326. As described above, the key value for the new record 326 is generated according to a second algorithm. At least in some embodiments, the second algorithm is different from the first algorithm—in other words, the algorithm for generating key values for existing records 324 is different from the algorithm for generating key values for new records 326. A "new" record refers to any record inserted after the existing table is successfully replicated. By using the different algorithms disclosed herein, the DBMS 150 may generate the key values more efficiently at least in some cases, such as by using an in-place alter, which is further described below. In some alternative embodiments, however, the same algorithm may be used to generate key values for both existing records 324 and new records 326.

In one embodiment, the second algorithm specifies to generate the key value for each new record 326 based on one or more components. In a particular embodiment, the components used by the second algorithm include the server node identifier 318, the first counter 208, the second counter 210, and a collision avoidance value 322. The first counter 208 may be referred to as a time counter, and the second counter 210 may be referred to as an insert counter. The time counter provides an ability to efficiently recover from a restart of the DBMS 150, and the insert counter makes efficient use of memory space in reducing counter overflows. The second algorithm uses both counters—as opposed to a single one—as a tradeoff between counter overflow avoidance and ability to recover from a server restart. Accordingly, the benefits of both counters may be had to some extent. The tradeoff may be tailored to suit the needs of a particular case, and in other embodiments, a single counter or more than two counters may be used.

In one embodiment, the collision avoidance value 322 may be defined by a developer of the DBMS 150, based on knowledge of the specific implementation of the DBMS 150. In particular, the DBMS 150 may assign slot numbers according to a predefined base index. If the base index is 1, the DBMS 150 only assigns slot numbers of 1 or greater. More generally, if the base index is n, the DBMS 150 only assigns slot numbers of n or greater. Any value that the DBMS 150 will not assign as a slot number may be used as a collision avoidance value. For example, if the base index is n, then the value of n−1 (e.g., 0 where n=1) may be used as a collision avoidance value. Using collision avoidance value(s) according to the techniques disclosed herein may prevent key values of new records from conflicting with key values of existing records in the table.

Further, at least in some environments, key value collisions may be prevented or reduced by using the counters—rather than the physical location of the record that is used by the first algorithm—in generating key values for new records. For example, assume that the physical location of the record is used in generating key values for new records as well as for existing records. Assume also that the key values remain unchanged, even if a new or existing record is subsequently moved to a different physical location (e.g., as a result of an update). If the physical location of the record is also used in generating key values for new records, collisions may occur because the new record may occupy a physical location previously occupied by another record (for which a key value is previously generated using the first algorithm). By using the counters maintained by each DBMS for generating key values for new records, such collisions may be avoided.

Assume instead that inserts are only allowed on a single copy of the table in the replication domain and that the inserts are replicated to at least one other copy of the table in the replication domain. In such environments, the physical location of the record may be used in generating key values for new records, without causing collisions between copies of the table. However, if deletions occur on the table, multiple records may occupy the same physical location over time. Data integrity issues may result if copies of the deleted records are maintained in a data warehouse. By using counters maintained by each DBMS for generating key values for new records, the collisions between copies of the table and the data integrity issues may be avoided.

In one embodiment, to generate the key value for the record representing William Jones, the DBMS 150 may concatenate the server node identifier of "5" (0x05), the first counter value of "7200" (0x1C20), the second counter value of "11500" (0x2CEC), and a collision avoidance value of "0" (0x00) together into a single bitstring. Suppose that the server node identifier is four bytes long, the first counter is four bytes long, the second counter is three bytes long, and the collision avoidance value is one byte long. The single bitstring may then be given by the hexadecimal value of 00000005 00001C20 002CEC00.

Those skilled in the art will recognize that the byte lengths of the components used by the second algorithm are merely exemplary and may be tailored to suit the needs of a particular case. Further, the byte lengths of the counters and the collision avoidance value may—but need not necessarily—correspond to the byte lengths of the components used by the first algorithm (namely, the table identifier, page number, and slot number). For example, in an alternative embodiment, the first counter may be two bytes long, and the second counter may be five bytes long. At least in some embodiments, to avoid collisions, only the collision avoidance value is required to have the same byte length as the slot number. Further, to avoid collisions, the byte lengths of the counters may be tailored based on an anticipated frequency of inserts in the replication domain. For example, if the first counter is incremented every second and the second counter is three bytes long (which can represent up to 2^24 or 16,777,216 insertions), then collisions may occur if more than 2^24 insertions occur in a given second. In addition, the order in which the components used by the second algorithm are concatenated may also be tailored to suit the needs of a particular case and need not necessarily correspond to the order in which the components used by the first algorithm are concatenated.

Further, although the example described in conjunction with FIG. 3 is presented in a context of storing employee data, such is not intended to be limiting of the invention. In other words, the techniques disclosed herein may be applied to tables that store any type of data. Further, other ways of generating the key values are broadly contemplated. For example, instead of concatenating components of the key value to form the single bitstring, the components may be interleaved to form the single bitstring. Additionally or alternatively, a predefined function may be applied to one or more of the components when forming the single bitstring. For example, a counter value may be multiplied by two for use in forming the single bitstring.

Although embodiments are described herein with reference to generating key values for records to be inserted into the table, using the components of the node identifier, the counters, and the collision avoidance value, other embodiments are broadly contemplated. For example, in an alternative embodiment, some or all of the components may be substituted with a universally unique identifier (UUID) or a sequence generator. In particular, the key values may be generated based on the UUID (or sequence generator) and the collision avoidance value. On the other hand, using counters may be more efficient than using UUIDs or sequence generators at least in some cases.

Figure 4:
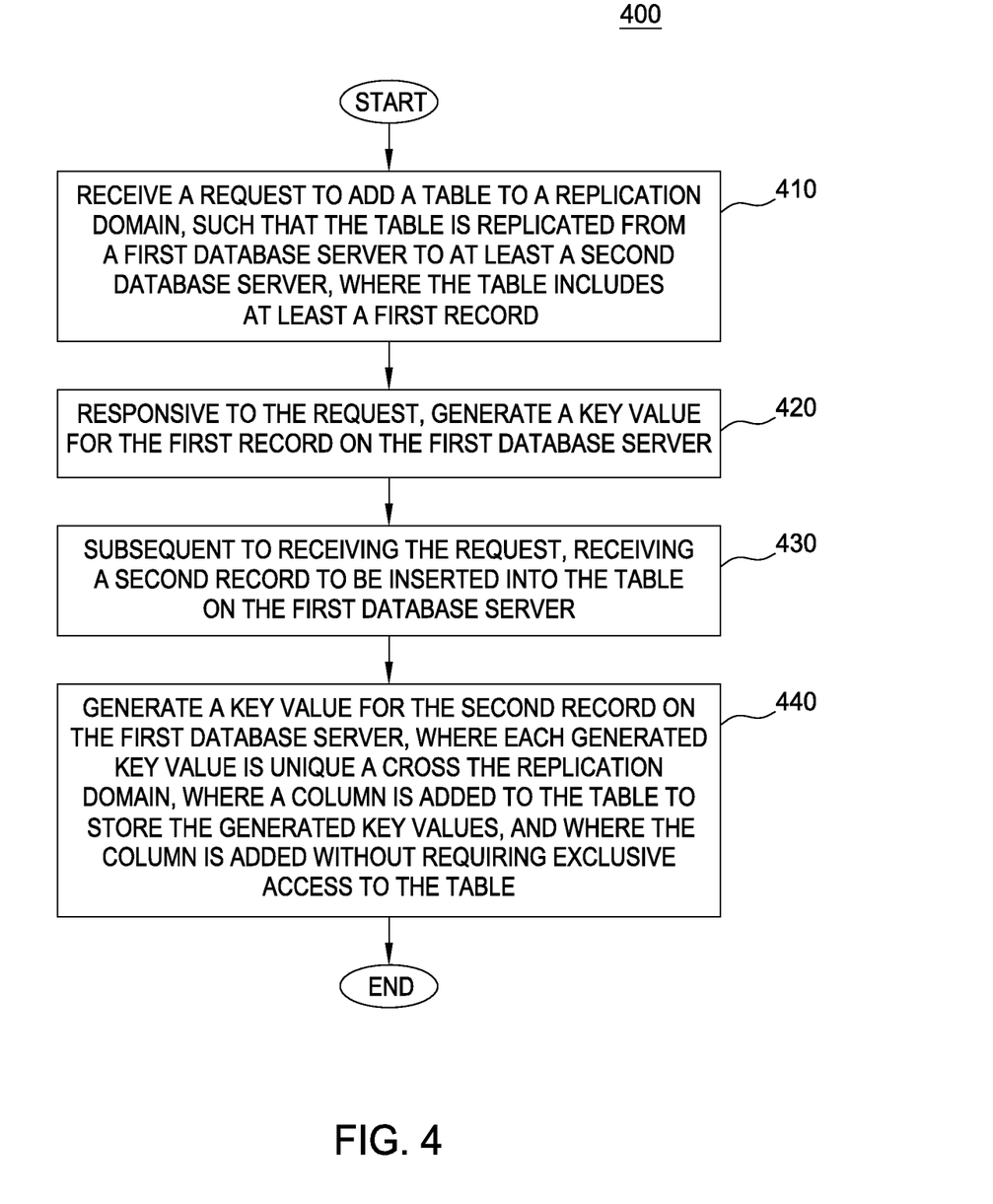
FIG. 4 is a flowchart depicting a method for adding a key column to a table to be replicated, according to one embodiment of the invention.

FIG. 4 is a flowchart 400 depicting a method for adding a key column to a table to be replicated, according to one embodiment of the invention. As shown, the method 400 begins at step 410, where the DBMS 150 receives a request to add a table to a replication domain, such that the table is replicated from a first database server to at least a second database server, where the table includes at least a first record. At step 420, responsive to the request, the DBMS 150 generates a key value for the first record on the first database server. At step 430, subsequent to receiving the request, the DBMS 150 receives a second record to be inserted into the table on the first database server. At step 440, the DBMS 150 generates a key value for the second record on the first database server. Each generated key value is unique across the replication domain. Further, the DBMS 150 adds a column to the table to store the generated key values. At least in some embodiments, the column is added without requiring exclusive access to the table. After the step 440, the method 400 terminates.

Figure 5:
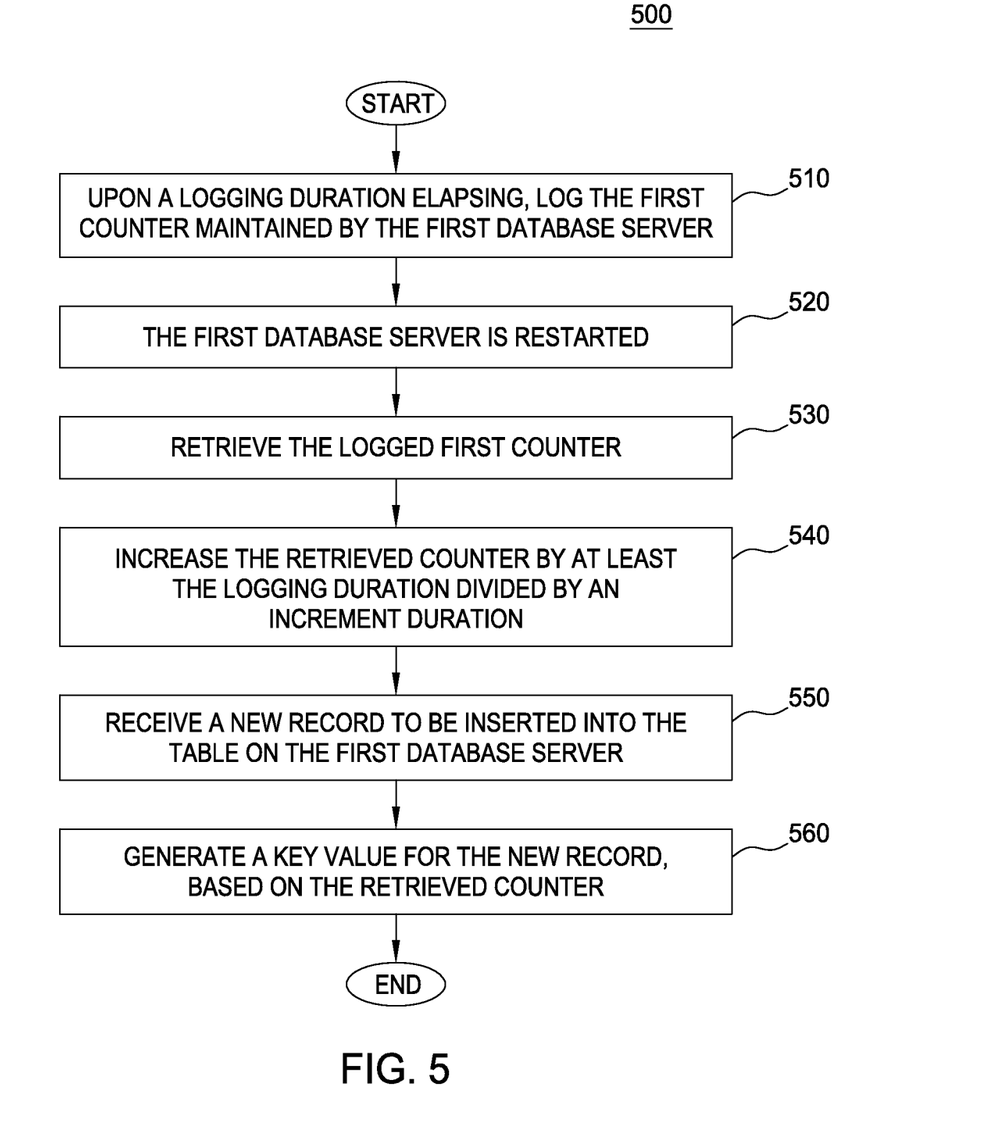
FIG. 5 is a flowchart depicting a method for generating a key value after a server restart, according to one embodiment of the invention.

FIG. 5 is a flowchart 500 depicting a method for generating a key value after a server restart, according to one embodiment of the invention. As described above, in some embodiments, the DBMS 150 maintains a first counter that is incremented every second (the increment duration) and logged every minute (the logging duration) and a second counter that is incremented upon every record insertion. As shown, the method 500 begins at step 510, where upon the logging duration elapsing, the DMBS 150 logs the first counter. For example, the first counter may be stored into a system table in the database 154$_1$. At step 520, the DBMS 150 is restarted. The DBMS 150 then retrieves the logged first counter (step 530) and increases the retrieved counter by at least the logging duration divided by the increment duration (step 540).

In one embodiment, the DBMS 150 then maintains the counter starting at the increased value. For example, if the most recently logged value for the first counter is "7200", upon a restart, the DBMS 150 maintains the first counter after initializing the first counter to "7260" (the logged value of 7200 plus sixty). Put another way, one second following the restart of the DBMS 150, the first counter is incremented to "7261" rather than "7201". At step 550, the DBMS 150 receives a new record to be inserted into the table on the first database server. At step 560, the DBMS 150 generates a key value for the new record, based on the counter. After the step 560, the method 500 terminates.

Figure 6A:
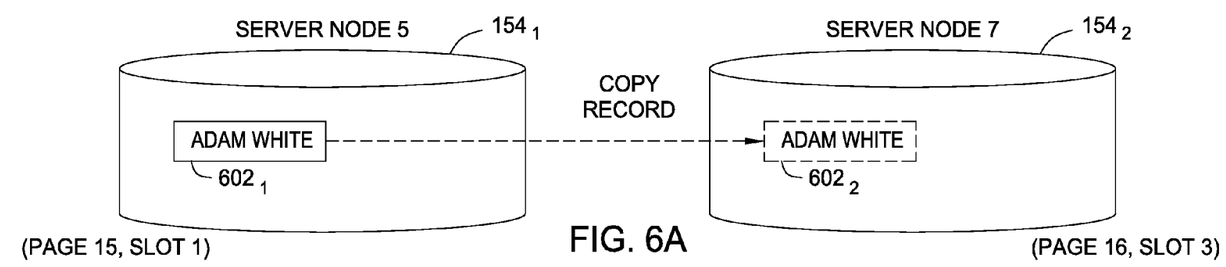
FIGS. 6A-6C depict databases at different stages of replication, according to one embodiment of the invention.
Figure 6B:
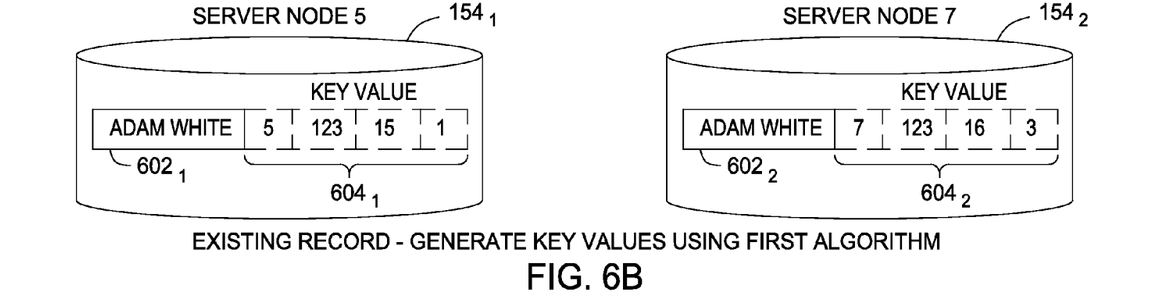
Figure 6C:
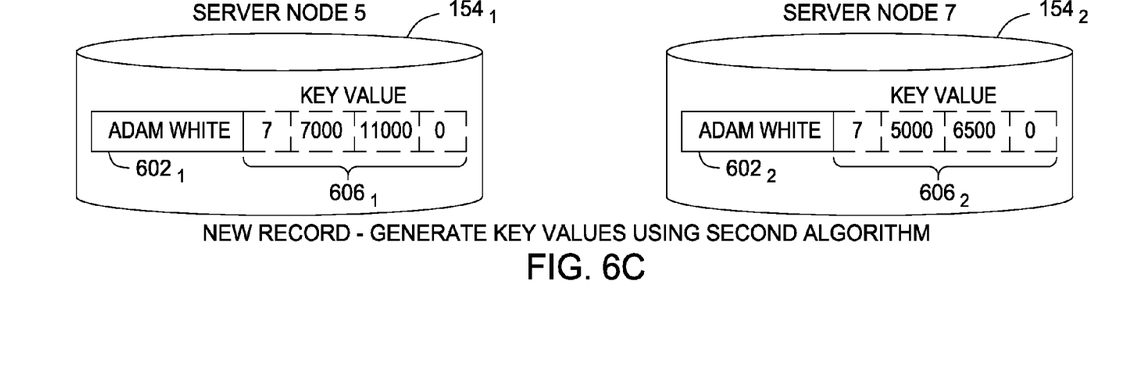

FIGS. 6A-6C depict the databases 154$_1$, 154$_2$ at different stages of replication, according to one embodiment of the invention. As shown in FIG. 6A, the server 154$_1$ has a node identifier of 5 and stores, in an employee table, a record 602$_1$ representing Adam White. Suppose that the employee table has a table number of 123. Upon receiving a request to replicate the employee table to the database 154$_2$, having a node identifier of 7, the record 602$_1$ is replicated to the database 154$_2$, to form a replicated record 602$_2$. Suppose that the record 602$_1$ is stored at page number of 15 and slot number of 1 of the first database 154$_1$, and suppose that the replicated record 602$_2$ is stored at page number of 16 and slot number of 3 of the second database 154$_2$.

In one embodiment, assuming that the record 602$_1$ existed at the time of the request, the database management systems for the databases 154$_1$, 154$_2$ each generate a key value for the respective copy of the record, based on the first algorithm. For example, as shown in FIG. 6B, the DBMS for the first database 154$_1$ generates a key value 604$_1$ that includes the node identifier of 5, the table number of 123, the page number of 15, and the slot number of 1. The DBMS for the second database 154$_2$ generates a key value 604$_2$ that includes the node identifier of 7, the table number of 123, the page number of 16, and the slot number of 3. Although embodiments have been described herein with reference to the matching table numbers in the databases 154$_1$, 154$_2$, in other embodiments, the table numbers need not necessarily match.

In one embodiment, assume that the record 602$_1$ did not exist at the time of the request but is instead requested to be newly added subsequent to replicating the employee table to the database 154$_2$. In such a case, the record 602$_1$ is also replicated to the database 154$_2$ (as shown in FIG. 6A). Further, the database management systems for the databases 154$_1$, 154$_2$ each generate a key value for the respective copy of the record, based on the second algorithm. For example, as shown in FIG. 6C, the DBMS for the first database 154$_1$ generates a key value 606$_1$ that includes the node identifier of 5, a first counter value of 7000, a second counter value of 11000, and a collision avoidance value of 0. The DBMS for the second database 164$_2$ generates a key value 606$_2$ that includes the node identifier of 7, a first counter value of 5000, a second counter value of 6500, and a collision avoidance value of 0. As described above, depending on the embodiment, the counter values used by the database management systems may originate from the single, globally-maintained counter or from multiple counters, each locally maintained by a respective DBMS.

Embodiments of the invention provide techniques for adding a key column to a table to be replicated, where the key column stores key values that are unique across a replication domain. One embodiment of the invention provides a database management system (DBMS) executing on a first database server. The DBMS receives a request to add a table to the replication domain, such that the table is replicated from the first database server to at least a second database server. The DBMS generates key values for both existing records in the table and new records subsequently requested to be inserted into the table, respectively. Each generated key value is unique across the replication domain. Further, the key column may be added to the table without requiring exclusive access to the table. Accordingly, the table may be added to the replication domain without disrupting access to the table by database applications.

While the foregoing is directed to embodiments of the present invention, other and further embodiments of the invention may be devised without departing from the basic scope thereof, and the scope thereof is determined by the claims that follow.

What is claimed is:

1. A computer-implemented method to add a key column to a table to be replicated, the computer-implemented method comprising:
    receiving a request to add the table to a replication domain, such that the table is replicated from a first database server to at least a second database server, wherein the table includes at least a first record;
    responsive to the request, generating a key value for the first record on the first database server, based on each of a table identifier of the table, a row identifier of the first record, and a node identifier of the first database server;
    subsequent to receiving the request, receiving a second record to be inserted into the table on the first database server; and
        generating a key value for the second record on the first database server, by operation of one or more computer processors and based on each of a first counter maintained by the first database server, a second counter maintained by the first database server, and the node identifier; wherein each generated key value is unique across the replication domain, wherein the key column is added to the table to store the generated key values, wherein the key column is added without requiring exclusive access to the table.

2. The computer-implemented method of claim 1, wherein the row identifier includes a page number component and a slot number component, wherein the slot number component contains a non-zero value, wherein the key value for the second record contains one or more bits corresponding to the slot number component and containing a zero value to prevent collision with any existing record in the table, wherein the key column comprises a shadow column, wherein the key column is added via an in-place alter command.

3. The computer-implemented method of claim 1, wherein the first database server is configured to increment the first counter upon a first period of time elapsing, wherein the first database server is further configured to increment the second counter upon a row being inserted into the first database server, wherein the first counter is logged upon a second period of time elapsing, wherein upon restarting the first database server, the logged first counter is retrieved and increased by at least the second period of time divided by the first period of time, to prevent collision with any key value generated prior to restarting the first database server.

4. The computer-implemented method of claim 1, wherein a key value is generated for each existing record in the table, based on a table identifier of the table, a row identifier of the respective, existing record, and a node identifier of the first database server, wherein a key value is generated for each new record to be inserted into the table, based on a first counter, a second counter, and the node identifier of the first database server, wherein each counter is maintained by the first database server.

5. The computer-implemented method of claim 1, wherein the row identifier includes a page number component and a slot number component.

6. The computer-implemented method of claim 1, wherein the key column comprises a shadow column.

7. The computer-implemented method of claim 1, wherein the key column is added via an in-place alter command.

8. A computer program product to add a key column to a table to be replicated, the computer program product comprising:
    a non-transitory computer-readable medium having computer-readable program code embodied therewith, the computer-readable program code executable by one or more computer processors to:
        receive a request to add a table to a replication domain, such that the table is replicated from a first database server to at least a second database server, wherein the table includes at least a first record;
        responsive to the request, generate a key value for the first record on the first database server, based on each of a table identifier of the table, a row identifier of the first record, and a node identifier of the first database server;
        subsequent to receiving the request, receive a second record to be inserted into the table on the first database server; and
        generate a key value for the second record on the first database server, based on each of a first counter maintained by the first database server, a second counter maintained by the first database server, and the node identifier;
        wherein each generated key value is unique across the replication domain, wherein the key column is added to the table to store the generated key values, wherein the column is added without requiring exclusive access to the table.

9. The computer program product of claim 8, wherein the row identifier includes a page number component and a slot number component, wherein the slot number component contains a non-zero value, wherein the key value for the second record contains one or more bits corresponding to the slot number component and containing a zero value to prevent collision with any existing record in the table, wherein the key column comprises a shadow column, wherein the key column is added via an in-place alter command.

10. The computer program product of claim 8, wherein the first database server is configured to increment the first counter upon a first period of time elapsing, wherein the first database server is further configured to increment the second counter upon a row being inserted into the first database server, wherein the first counter is logged upon a second period of time elapsing, wherein upon restarting the first database server, the logged first counter is retrieved and increased by at least the second period of time divided by the first period of time, to prevent collision with any key value generated prior to restarting the first database server.

11. The computer program product of claim 8, wherein a key value is generated for each existing record in the table, based on a table identifier of the table, a row identifier of the respective, existing record, and a node identifier of the first database server, wherein a key value is generated for each new record to be inserted into the table, based on a first counter, a second counter, and the node identifier of the first database server, wherein each counter is maintained by the first database server.

12. The computer program product of claim 8, wherein the row identifier includes a page number component and a slot number component.

13. The computer program product of claim 8, wherein the key column comprises a shadow column.

14. The computer program product of claim 8, wherein the key column is added via an in-place alter command.

15. A system to add a key column to a table to be replicated, the system comprising:
   one or more computer processors;
   a memory containing a program, which when executed by the one or more computer processors is configured to perform an operation comprising:
      receiving a request to add a table to a replication domain, such that the table is replicated from a first database server to at least a second database server, wherein the table includes at least a first record;
      responsive to the request, generating a key value for the first record on the first database server, based on each of a table identifier of the table, a row identifier of the first record, and a node identifier of the first database server;
      subsequent to receiving the request, receiving a second record to be inserted into the table on the first database server; and
      generating a key value for the second record on the first database server, based on each of a first counter maintained by the first database server, a second counter maintained by the first database server, and the node identifier;
      wherein each generated key value is unique across the replication domain, wherein the key column is added to the table to store the generated key values, wherein the column is added without requiring exclusive access to the table.

16. The system of claim 15, wherein the row identifier includes a page number component and a slot number component, wherein the slot number component contains a non-zero value, wherein the key value for the second record contains one or more bits corresponding to the slot number component and containing a zero value to prevent collision with any existing record in the table, wherein the key column comprises a shadow column, wherein the key column is added via an in-place alter command.

17. The system of claim 15, wherein the first database server is configured to increment the first counter upon a first period of time elapsing, wherein the first database server is further configured to increment the second counter upon a row being inserted into the first database server, wherein the first counter is logged upon a second period of time elapsing, wherein upon restarting the first database server, the logged first counter is retrieved and increased by at least the second period of time divided by the first period of time, to prevent collision with any key value generated prior to restarting the first database server.

18. The system of claim 15, wherein the row identifier includes a page number component and a slot number component.

19. The system of claim 15, wherein the key column comprises a shadow column.

20. The system of claim 15, wherein the key column is added via an in-place alter command.

* * * * *